Oct. 4, 1949.  C. C. BRINKOETER  2,483,804
SWEAT ELIMINATOR FOR FROZEN FOOD CASES
Filed Sept. 15, 1947  4 Sheets-Sheet 1
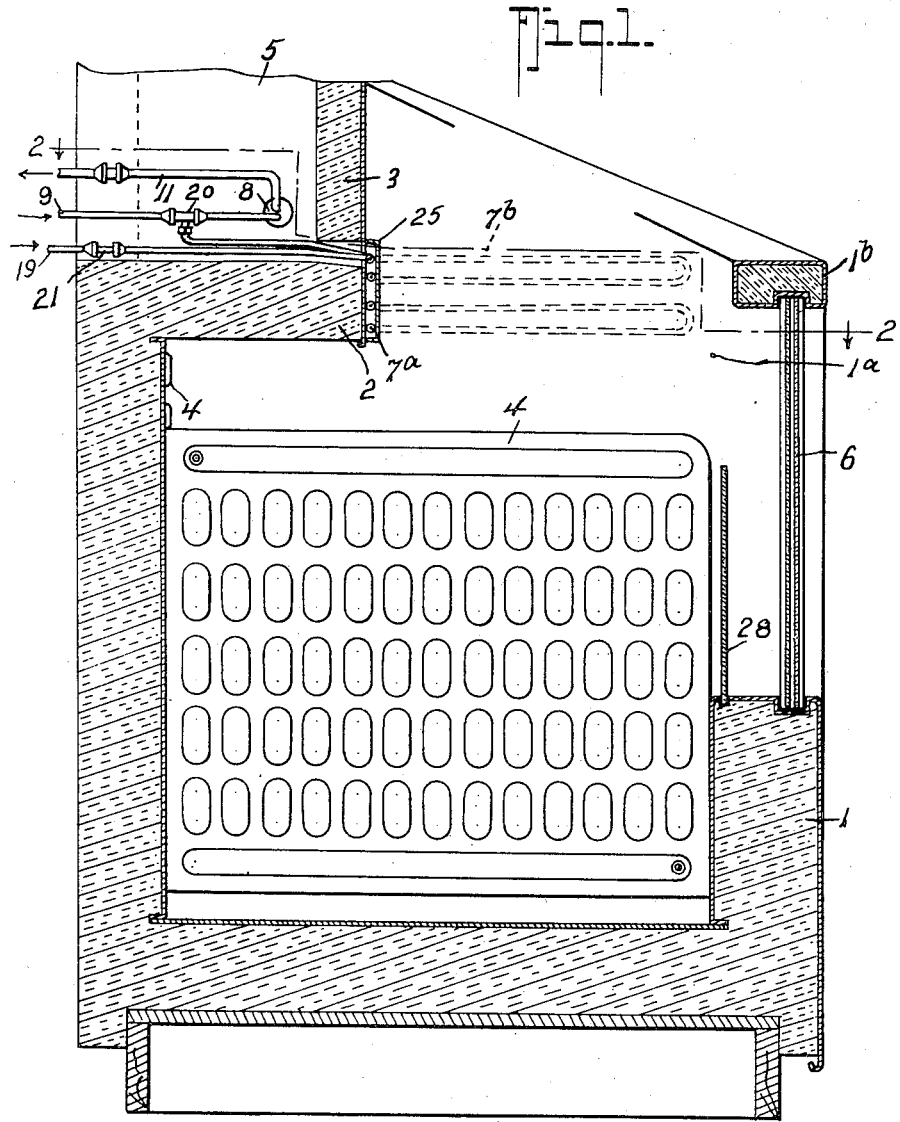
Inventor,
Clinton C. Brinkoeter,
By Albert E. Dieterich
Attorney.

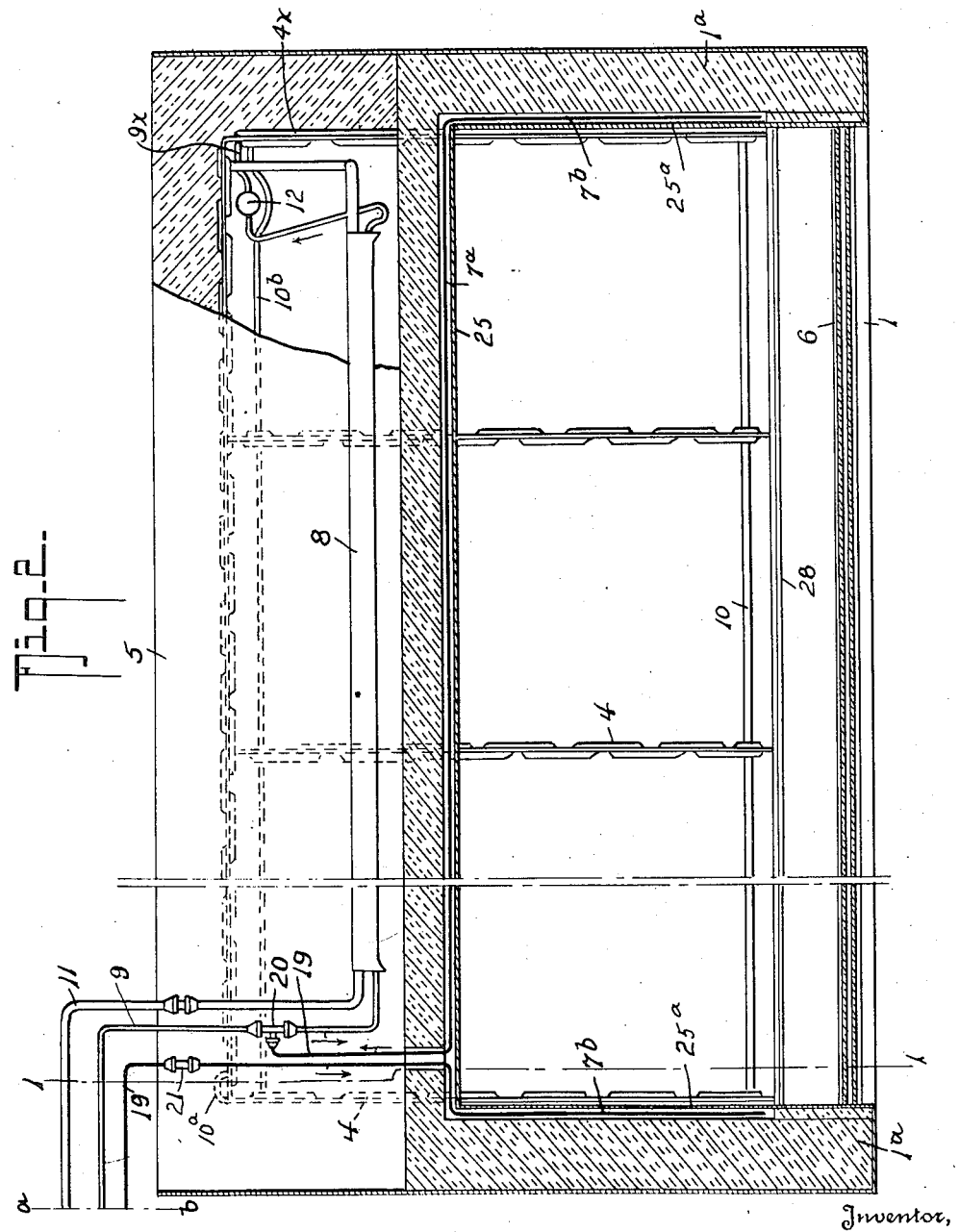

Oct. 4, 1949. C. C. BRINKOETER 2,483,804
SWEAT ELIMINATOR FOR FROZEN FOOD CASES
Filed Sept. 15, 1947 4 Sheets-Sheet 3
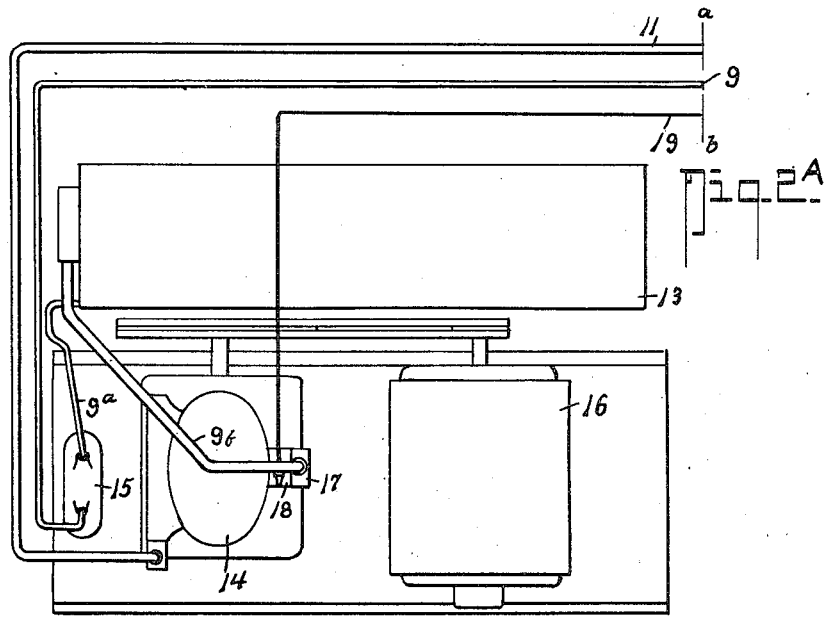
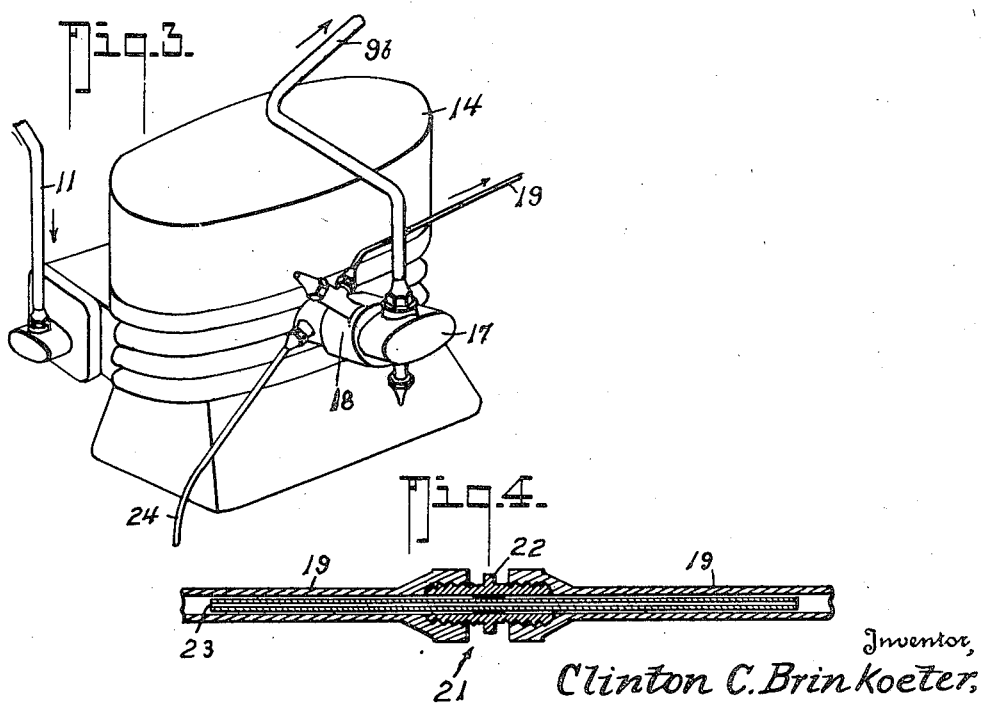
Inventor,
Clinton C. Brinkoeter,
By Albert E. Dieterich,
Attorney.

Oct. 4, 1949.  C. C. BRINKOETER  2,483,804
SWEAT ELIMINATOR FOR FROZEN FOOD CASES
Filed Sept. 15, 1947  4 Sheets-Sheet 4
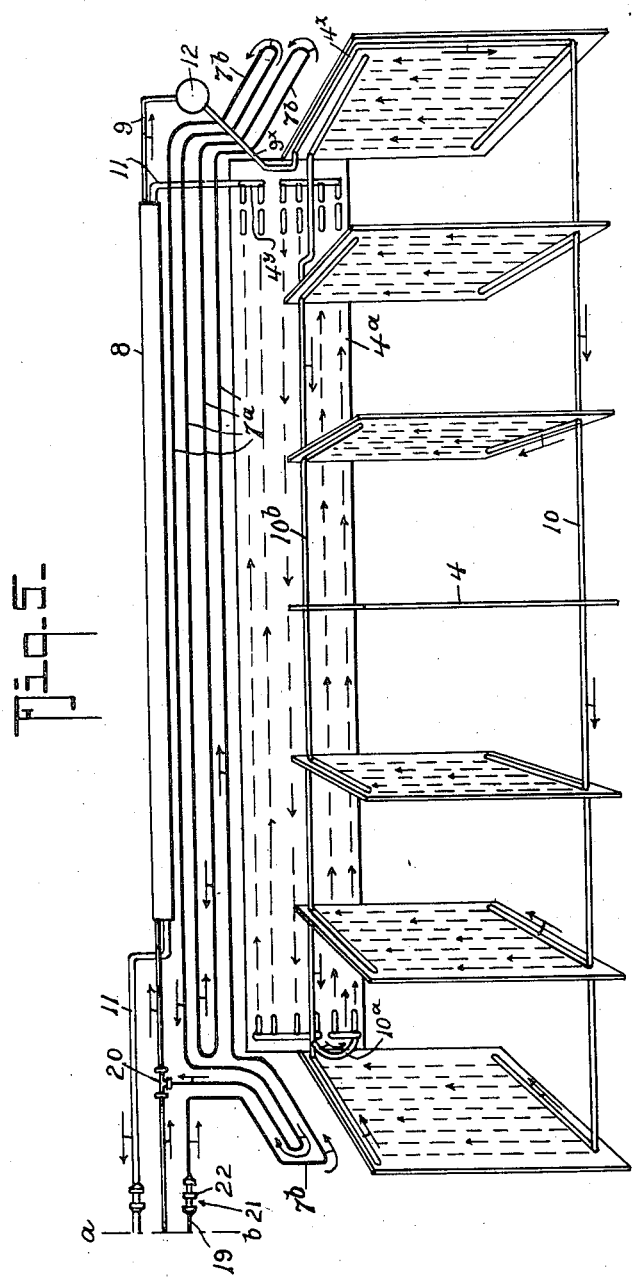
Inventor,
Clinton C. Brinkoeter,
By Albert E. Dieterich,
Attorney.

Patented Oct. 4, 1949

2,483,804

UNITED STATES PATENT OFFICE 2,483,804

SWEAT ELIMINATOR FOR FROZEN FOOD CASES

Clinton C. Brinkoeter, San Antonio, Tex., assignor to Ed. Friedrich, Inc., San Antonio, Tex., a corporation of Texas Application September 15, 1947, Serial No. 774,055

8 Claims. (Cl. 62—89)

My invention relates to open top frozen food cases of the kind wherein an inner semi-ceiling or overhang projects forwardly a short distance from the back wall of the cabinet at about the level of the top rail of the front window.

The objects of the invention are:

1. To provide means to prevent condensation on the surfaces of the overhang and on the sides of the case at about the level of the top rail.

2. To provide means for warming the back and side walls around the opening in the top of the case and thereby eliminate sweat.

3. To provide automatic means to accomplish the objects above stated.

Other objects will in part be obvious and in part will be pointed out hereinafter.

To the attainment of the aforesaid objects, the invention resides in the novel features of construction, combinations, and arrangements of parts, all of which will first be described in detail and then be specifically pointed out in the appended claims, reference being had to the accompanying drawings in which:

Fig. 1 is a cross section of a case taken approximately on the line 1—1 of Fig. 2.

Fig. 2 is a somewhat schematic section on the line 2—2 of Fig. 1.

Fig. 2A is a schematic plan view of a refrigerating unit and, when joined to Fig. 2 on the lines a—b, constitutes with Fig. 2 a complete schematic view of the invention.

Fig. 3 is an enlarged perspective view of the compressor.

Fig. 4 is an enlarged longitudinal section of the choke device used in the warming line.

Fig. 5 is a perspective view, largely schematic, of the refrigerator cooling unit and the sweat eliminator coils connected to the cooling system, and, when joined with Fig. 2 on the lines a—b illustrate the flow of refrigerant through the cooling unit 4, 4a and through the sweat eliminator coils 7a, 7b.

Referring now to the accompanying drawings, it will be seen that 1 represents a frozen food case to which my invention applies, 2 the semi-ceiling or overhang, 1a the side wall of the case, 1b the top rail of the front window 6, 3 the upper front wall that extends above the level of the top rail, 5 a chamber above the semi-ceiling and the wall 3, and 28 the glass baffle between the window 6 and the cooling plate, unit 4, of known construction.

Placed in front of the semi-ceiling at about the level of the front rail 1b is a coil 7a that extends substantially the full width of the case from side 1a to side 1a and 7b indicates two coils located at the sides of the case, also at about the level of the rail 1b.

The coils 7a, 7b, 7b may be left exposed, but I prefer to place them behind a metal shield 25 and in back of the metal liner (25a Fig. 2) of the food compartment. The coils 7b, 7a, 7b are connected in series.

One end of the series is connected to a choke 21 and the other end is connected to a T 20 in the liquid line 9 that connects with the freezing unit 4, 4a and the receiver 15, see Figs. 2, 2A. The freezing unit, which includes the vertical set of parallel plate coils 4, the back plate coil 4a, the pipes 10, 10a, 10b, is of known construction and, per se, is not of the present invention. The intake header 4x is connected to the expansion valve 12, as at 9x, while the outlet header 4y of the cooling coil system is connected to the return line 11.

The gas line 9b from the compressor 14 leads into the condenser 13, while a liquid line 9a leads from the condenser 13 to the receiver 15.

The liquid line 9 passes from the T 20 through the heat exchanger 8 to an expansion valve 12 and from thence to the inlet end of the freezing unit. The plate coils 4 are connected by pipes 10, 10a, 10b, so as to obtain the proper circulation of refrigerant through the same to the return line 11. The return line 11 goes to the intake or low side of the compressor (see Figs. 2, 2A and 3).

The compressor 14 is driven by the usual motor 16.

Connected between the compressor head and the usual discharge valve 17 of the compressor, I place an extension with a service valve 18 to which is connected warm line 19 that connects to the choke 21. The line 19, in practice, consists of a ¼ inch copper tubing in which is installed a union 22 in which union and line is installed a small copper tubing 23 which has an outside diameter of about .120 inch and an inside diameter of about 0.59 inch. This tubing 23 is about 15 inches long and forms a restriction in line 19.

The pipe 24, shown in Fig. 3, is the one going to the usual pressure control device (not shown, since it comprises no part of my invention).

As will be seen from the above, when the apparatus is working a certain amount of hot gas, as it is compressed by the compressor, escapes in line 19 instead of going through the condenser. However, the choke controls the amount of this escaping gas that can go through the sweat eliminating coils 7a, 7b in the refrigerator case 1. This hot gas keeps the surfaces of the case at the location of the coils 7ᵃ—7ᵇ warm to prevent any water from condensing on these surfaces, thereby keeping them dry, whereas when the sweat eliminator is not used continual condensation takes place at these positions, causing the case to be wet and drippage to fall on the merchandise.

An object of the present invention is to use some of the gas that is compressed in the compressor head, at which place it is at its highest temperature, and dissipate the heat of this gas through the sweat eliminator 7ᵃ, 7ᵇ on the refrigerator. In other words by keeping the surface of 25 and 25ᵃ warm, it prevents condensation from forming on these surfaces. By using this hot gas and moving it through the series of pipes (7ᵇ, 7ᵃ, 7ᵇ) of the sweat eliminator, the entire surface of the case adjacent to the eliminator is kept at a warm temperature and hence moisture will not collect or condense on the same.

From the foregoing description, taken in connection with the accompanying drawings, it is thought that the construction, operation and advantages of the invention will be clear to those skilled in the art.

What I claim is:

1. In an open top frozen food refrigerator case having a semi-ceiling, a front window with a top rail located at approximately the level of the semi-ceiling, and having a food chamber below the semi-ceiling in which chamber a freezing unit it located; the improvement which includes a warming coil at the front of the semi-ceiling and warming coils at the sides of the case, said coils being located at about the level of said top rail, and means to circulate a predetermined limited amount only of hot gas through said coils.

2. In a refrigerating system for open top frozen food cases wherein a freezing unit is employed in the food chamber beneath a semi-ceiling and wherein the usual compressor, condenser and receiver are employed, and wherein the usual liquid and return lines and heat exchanger are employed, the improvement which comprises a restricted by-pass duct between the high side of the compressor and the liquid line, said by-pass duct including warming coils in the case along three sides of the opening at the top of the case and adjacent the walls surrounding the same.

3. In a refrigerating system for open top frozen food cases wherein a freezing unit is employed in the food chamber beneath a semi-ceiling and wherein the usual compressor, condenser and receiver are employed, and wherein the usual liquid and return lines and heat exchanger are employed, the improvement which comprises a restricted by-pass duct between the high side of the compressor and the liquid line, said by-pass duct including warming coils in the case along the front of the semi-ceiling adjacent the opening at the top of the case.

4. In a refrigerating system for open top frozen food cases wherein a freezing unit is employed in the food chamber beneath a semi-ceiling and wherein the usual compressor, condenser and receiver are employed, and wherein the usual liquid and return lines and heat exchanger are employed, the improvement which comprises a restricted by-pass duct between the high side of the compressor and the liquid line, said by-pass duct including warming coils in the case along three sides of the opening at the top of the case and adjacent the walls surrounding the same, and a choke in said restricted by-pass duct.

5. In a refrigerating system for open top frozen food cases wherein a freezing unit is employed in the food chamber beneath a semi-ceiling and wherein the usual compressor, condenser and receiver are employed, and wherein the usual liquid and return lines and heat exchanger are employed, the improvement which comprises a restricted by-pass duct between the high side of the compressor and the liquid line, said by-pass duct including warming coils in the case along the front of the semi-ceiling adjacent the opening at the top of the same, and a choke in said restricted by-pass duct.

6. In a refrigerating system for open top frozen food cases containing a freezing unit and a sweat eliminator unit having an intake and an outlet side, the combination with the same of a compressor, condenser and receiver unit, the compressor having a high side and a low side, a duct between the high side of the compressor and the condenser, a duct between the condenser and the receiver, a duct between the receiver and the freezing unit, which duct includes an expansion valve, a duct between the freezing unit and the low side of the compressor, a by-pass duct between the high side of the compressor and the intake side of the sweat eliminator unit, a connection between said sweat eliminator unit outlet side and said duct having the expansion valve, and a choke in said by-pass duct.

7. In a refrigerating system for an open top frozen food case wherein is provided an overhang adjacent the back of the case beneath which is the food chamber in which chamber freezing unit is located and in which system the usual compressor, condenser and receiver are employed, the improvement which includes a warming coil at the front of the overhang and warming coils at the sides or ends of the case at substantially the level of the overhang, and means for by-passing a restricted amount of hot gas from the high side of the compressor through said warming coils.

8. In a refrigerating system for an open top frozen food case wherein is provided an overhang adjacent the back of the case beneath which is the food chamber in which chamber freezing unit is located and in which system the usual compressor, condenser and receiver are employed, the improvement which includes a warming coil at the front of the overhang, and means for bypassing a restricted amount of hot gas from the high side of the compressor through said warming coil.

CLINTON C. BRINKOETER.

REFERENCES CITED

The following references are of record in the file of this patent:

UNITED STATES PATENTS

| Number | Name | Date |
| --- | --- | --- |
| 2,128,386 | Warren | Aug. 30, 1938 |
| 2,207,586 | Hill | July 9, 1940 |
| 2,238,511 | Thaxter | Apr. 15, 1941 |
| 2,287,997 | Jarvis | June 30, 1942 |
| 2,321,695 | Miller | June 15, 1943 |
| 2,379,885 | Davis | July 10, 1945 |
| 2,430,329 | Davis | Nov. 4, 1947 |